United States Patent
Zheng et al.

(10) Patent No.: US 9,910,775 B2
(45) Date of Patent: *Mar. 6, 2018

(54) COMPUTING SYSTEM WITH ADAPTIVE BACK-UP MECHANISM AND METHOD OF OPERATION THEREOF

(71) Applicant: Samsung Electronics Co., Ltd., Suwon-si, Gyeonggi-Do (KR)

(72) Inventors: Hongzhong Zheng, Sunnyvale, CA (US); Keith Chan, Newark, CA (US); Wonseok Lee, Kyoung KI (KR); Tackhwi Lee, San Jose, CA (US)

(73) Assignee: Samsung Electronics Co., Ltd., Gyeonggi-Do (KR)

( * ) Notice: Subject to any disclaimer, the term of this patent is extended or adjusted under 35 U.S.C. 154(b) by 50 days.

This patent is subject to a terminal disclaimer.

(21) Appl. No.: 15/160,780

(22) Filed: May 20, 2016

(65) Prior Publication Data

US 2016/0267007 A1 Sep. 15, 2016

Related U.S. Application Data (63) Continuation-in-part of application No. 14/501,851, filed on Sep. 30, 2014, now Pat. No. 9,372,759.

(60) Provisional application No. 62/012,825, filed on Jun. 16, 2014.

(51) Int. Cl.
*G06F 11/00* (2006.01)
*G06F 12/0804* (2016.01)
*G06F 12/0868* (2016.01)
*G06F 11/14* (2006.01)
*G06F 11/20* (2006.01)

(52) U.S. Cl.
CPC ...... *G06F 12/0804* (2013.01); *G06F 11/1441* (2013.01); *G06F 12/0868* (2013.01); *G06F 11/2015* (2013.01); *G06F 2212/1032* (2013.01)

(58) Field of Classification Search
USPC .......................................................... 714/22
See application file for complete search history.

(56) References Cited

U.S. PATENT DOCUMENTS

| | | | | |
|---|---|---|---|---|
| 2010/0076714 A1* | 3/2010 | Discenzo | ............... | H02N 2/181 702/104 |
| 2010/0332896 A1* | 12/2010 | Wilson | ...................... | G06F 1/30 714/14 |
| 2010/0332897 A1* | 12/2010 | Wilson | ................... | G11C 5/141 714/14 |
| 2012/0210169 A1* | 8/2012 | Coile | ................... | G06F 11/2092 714/22 |
| 2014/0215277 A1* | 7/2014 | Judd | ................... | G06F 11/2284 714/42 |
| 2015/0279463 A1 | 10/2015 | Berke | | |

* cited by examiner

*Primary Examiner* — Sarai Butler
(74) *Attorney, Agent, or Firm* — IP Investment Law Group (57) ABSTRACT

A computing system includes: an adaptive back-up controller configured to calculate an adaptive back-up time based on a reserve power source for backing up a volatile memory to a nonvolatile memory; and a processor core, coupled to the adaptive back-up controller, configured to back up at least a portion of the volatile memory to the nonvolatile memory within the adaptive back-up time based on a back-up priority.

20 Claims, 6 Drawing Sheets

COMPUTING SYSTEM WITH ADAPTIVE BACK-UP MECHANISM AND METHOD OF OPERATION THEREOF

CROSS-REFERENCE TO RELATED APPLICATION(S)

This application is a Continuation-in-Part to U.S. patent application Ser. No. 14/501,851 filed Sep. 30, 2014, and the subject matter thereof is incorporated herein by reference thereto. U.S. patent application Ser. No. 14/501,851 filed Sep. 30, 2014 further claims the benefit of U.S. Provisional Patent Application Ser. No. 62/012,825 filed Jun. 16, 2014, the subject matter thereof is incorporated herein by reference thereto.

TECHNICAL FIELD

An embodiment of the present invention relates generally to a computing system, and more particularly to a system with back-up.

BACKGROUND

Modern consumer and industrial electronics, such as computing systems, servers, appliances, televisions, cellular phones, automobiles, satellites, and combination devices, are providing increasing levels of functionality to support modern life. While the performance requirements can differ between consumer products and enterprise or commercial products, there is a common need for data retention to avoid loss of data.

Research and development in the existing technologies can take a myriad of different directions. Some have taken a memory hierarchy approach utilizing volatile and non-volatile memory for operational performance and for avoiding loss of data when power is lost. However, available systems do not guarantee no loss of data.

Thus, a need still remains for a computing system with back-up mechanism for eliminating data loss. In view of the ever-increasing commercial competitive pressures, along with growing consumer expectations and the diminishing opportunities for meaningful product differentiation in the marketplace, it is increasingly critical that answers be found to these problems. Additionally, the need to reduce costs, improve efficiencies and performance, and meet competitive pressures adds an even greater urgency to the critical necessity for finding answers to these problems.

Solutions to these problems have been long sought but prior developments have not taught or suggested any solutions and, thus, solutions to these problems have long eluded those skilled in the art.

SUMMARY

An embodiment of the present invention provides an apparatus, including: an adaptive back-up controller configured to calculate an adaptive back-up time based on a reserve power source for backing up a volatile memory to a nonvolatile memory; and a processor core, coupled to the adaptive back-up controller, configured to back up at least a portion of the volatile memory to the nonvolatile memory within the adaptive back-up time based on a back-up priority.

An embodiment of the present invention provides a method, including: calculating an adaptive back-up time based on a reserve power source for backing up a volatile memory to a nonvolatile memory; and backing up at least a portion of the volatile memory to the nonvolatile memory within the adaptive back-up time based on a back-up priority.

Certain embodiments of the invention have other steps or elements in addition to or in place of those mentioned above. The steps or elements will become apparent to those skilled in the art from a reading of the following detailed description when taken with reference to the accompanying drawings.

DETAILED DESCRIPTION

Embodiments prevent or eliminate data loss when there is a power failure because the embodiments adaptively controls the time intervals of normal data back-up modes to guarantee that all data back-up before total power failure. Embodiments calculate the available back-up time available to the reserve power source for given conditions present for backing up the data from the volatile memory. Embodiments can calculate the adaptive back-up time based on the available back-up time. The adaptive back-up time helps control the back-up of the volatile memory to the nonvolatile memory during normal operation, e.g. without power failure.

Embodiments further prevent or eliminate data loss when there is a power failure because the embodiments dynamically adjust the time intervals of the normal data back-up modes to guarantee all data can be backed up before total power failure. Embodiments adjusts the available back-up time possible by the reserve power source when conditions influencing the ability to back-up the data change. The available back-up time is dynamically adjusted as the reserve power source discharges or is utilized when a power failure has been detected. The available back-up time can further be dynamically adjusted if the reserve power source can be at least partially recharged. Embodiments can adjust the adaptive back-up time based on adjustments to the available back-up time of the reserve power source. The dynamic adjustments to the adaptive back-up time allow it to be variable as opposed to a fixed time interval. The dynamic adjustments to the adaptive back-up time further help control the back-up of the volatile memory to the nonvolatile memory during normal operation while avoiding data loss when power failure is detected.

Embodiments yet further prevent or eliminate data loss when there is a power failure because the embodiments adaptively control the amount of data from the volatile memory to be backed up during normal data back-up mode to guarantee all data back-up before total power lost. As the embodiments calculate the available back-up time and the adaptive back-up time, the embodiments can also calculate how much data from the volatile memory needs to be backed-up in normal operations with the write entries commit, and therefore can schedule back-ups to ensure that data will not be lost when power failure is detected based on the remaining charge in the reserve power source.

Embodiments yet further prevent or eliminate data loss when there is a power failure because the embodiments adjusts the amount of data from the volatile memory to be backed up during normal data back-up mode to guarantee all data back-up before total power lost. As the embodiments adjusts the available back-up time and the adaptive back-up time, the embodiments can also adjust how much data from the volatile memory needs to be backed-up in normal operations with adjustments to the write entries commit to ensure that data will not be lost when power failure is detected and the back-up process is based on the remaining charge in the reserve power source.

Embodiments prevent or eliminate data loss when there is a power failure because the embodiments improve the back-up of the volatile memory with settings to help avoid loss of the desired data in the volatile memory. Embodiments can transfer data from the volatile memory in full burst length to improve efficiency of backing up data during the power failure. Also, embodiments can improve efficiency of backing up the data to the nonvolatile memory by writing to the nonvolatile memory in a faster write mode. Further, embodiments can improve backing up the data by transferring the data through a power saving path instead of the normal data path during the power failure.

Embodiments with a back-up priority can select types or portions from the volatile data to be backed up to the non-volatile memory. The back-up priority can provide a single tier priority mechanism or a multi-tier priority mechanism. Embodiments can also operate to deprioritize system tasks not identified by the back-up priority. Embodiments can further operate to pause or stop system tasks not identified by the back-up priority.

The following embodiments are described in sufficient detail to enable those skilled in the art to make and use the invention. It is to be understood that other embodiments would be evident based on the present disclosure, and that system, process, architectural, or mechanical changes can be made without departing from the scope of an embodiment of the present invention.

In the following description, numerous specific details are given to provide a thorough understanding of the various embodiments of the invention. However, it will be apparent that various embodiments may be practiced without these specific details. In order to avoid obscuring various embodiments, some well-known circuits, system configurations, and process steps are not disclosed in detail.

The drawings showing embodiments of the system are semi-diagrammatic, and not to scale and, particularly, some of the dimensions are for the clarity of presentation and are shown exaggerated in the drawing figures. Similarly, although the views in the drawings generally show similar orientations, this depiction in the figures is arbitrary for the most part. Generally, an embodiment can be operated in any orientation.

The term "module" referred to herein can include software, hardware, or a combination thereof in an embodiment of the present invention in accordance with the context in which the term is used. For example, the software can be machine code, firmware, embedded code, application software, or a combination thereof. Also for example, the hardware can be circuitry, processor, computer, integrated circuit, integrated circuit cores, a pressure sensor, an inertial sensor, a microelectromechanical system (MEMS), passive devices, or a combination thereof. Further, if a module is written in the apparatus claims section, the modules are deemed to include hardware circuitry for the purposes and the scope of apparatus claims.

The modules in the following description of the embodiments can be coupled to one other as described or as shown. The coupling can be direct or indirect without or with, respectively, intervening items between coupled items. The coupling can be by physical contact or by communication between items.

Figure 1:
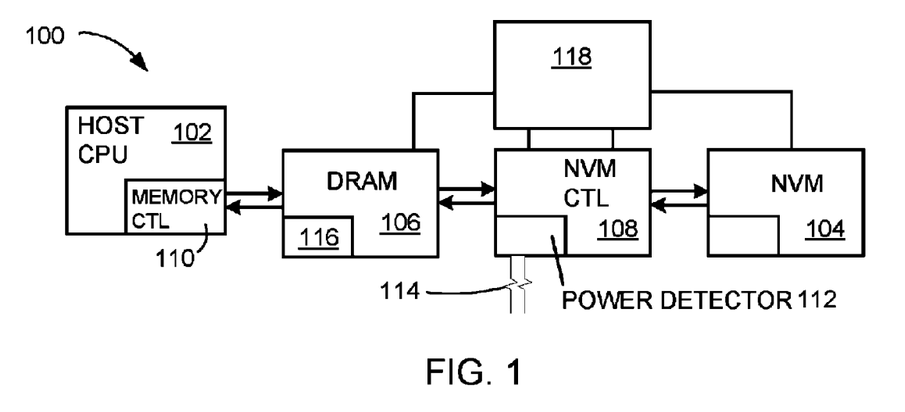
FIG. 1 is a computing system with an adaptive back-up mechanism in an embodiment of the present invention.

Referring now to FIG. 1, therein is shown a computing system 100 with an adaptive back-up mechanism in an embodiment of the present invention. FIG. 1 depicts one embodiment of the computing system 100 where data can be backed-up. The term backed-up refers to storage of data for data retention or to avoid losing data due to power failure to the computing system 100 or a portion of the computing system 100.

The computing system 100 can depict an embodiment where a host processor 102 can be (but need not be) on the same system board (not shown), such as a printed circuit board, a plug in card, or a mezzanine card, as a nonvolatile memory 104, volatile memory 106, and a local memory controller 108. The host processor 102 can store data in the volatile memory 106, the nonvolatile memory 104, or a combination thereof. The host processor 102, the local memory controller 108, or a combination thereof can utilize the nonvolatile memory 104 to adaptively back-up the data from the volatile memory 106, as will be discussed in more detail in FIGS. 6, 7, and 8.

The host processor 102 can include a host memory controller 110 for interacting with the volatile memory 106, the nonvolatile memory 104, the local memory controller 108, or a combination thereof. The host memory controller 110 provides protocol support for interacting with the volatile memory 106, the nonvolatile memory 104, the local memory controller 108, or a combination thereof.

Examples for the host processor 102 can include a general purpose microprocessor, a multi-core processor device, a digital signal processor (DSP), or an application specific integrated circuit (ASIC) with processing capability. Examples for the host memory controller 110 can include a random access memory (RAM) controller. The RAM can be volatile, such as a dynamic random access memory (DRAM) or a static random access memory (SRAM). The RAM can also be nonvolatile, such as a solid state flash memory.

The local memory controller 108 provides controls for data movement between the volatile memory 106 and the nonvolatile memory 104. The local memory controller 108 can be a nonvolatile memory controller, in this example. The local memory controller 108 can also adaptively back-up data from the volatile memory 106 to the nonvolatile memory 104, described in more detail in FIGS. 6, 7, and 8.

The local memory controller 108 can include a power detector 112 for detecting a power failure 114 requiring at least a portion of the volatile data 116 to be backed-up to the nonvolatile memory 104. FIG. 1 depicts the power failure 114 as an indicator between a reserve power source 118 and the local memory controller 108.

The power failure 114 refers to a condition where a portion of the data stored in the volatile memory 106 is at risk of being lost or not being retrievable. The power failure 114 also refers to a condition where data cannot be written to the nonvolatile memory 104. As examples, both these conditions for the power failure 114 can be due to insufficient power being supplied to the volatile memory 106 or the nonvolatile memory 104. Also for example, the power failure 114 can also indicate insufficient power being supplied to any part of the data path between the volatile memory 106 and the nonvolatile memory 104 that can cause data loss without back-up to the nonvolatile memory 104.

The reserve power source 118 provides the energy for the back-up mechanism when the power failure 114 condition is detected. The reserve power source 118 can be connected to a primary power source (not shown), which provides power for the normal operation of the computing system 100, the data transfer with the volatile memory 106, the data transfer with the nonvolatile memory 104, or a combination thereof.

The reserve power source 118 can be implemented in a number of ways. As an example, the reserve power source 118 can be an energy source implemented with a battery or a capacitor. The reserve power source 118 can be rechargeable, as an example, with the primary power source.

Figure 2:
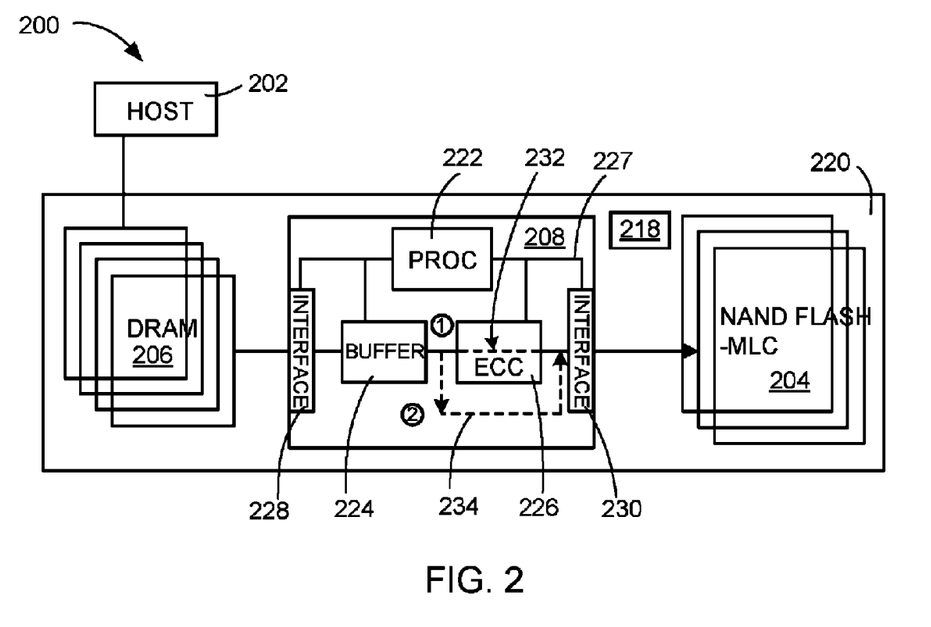
FIG. 2 is a computing system with an adaptive back-up mechanism in a further embodiment of the present invention.

Referring now to FIG. 2, therein is shown a computing system 200 with an adaptive back-up mechanism in a further embodiment of the present invention. The description for the computing system 100 of FIG. 1 also applies to the computing system 200. For this embodiment, the description from FIG. 1 is applicable for elements with the same element name, even though the element can be labeled with a different element number. Much of the similarities are not repeated in this embodiment description for brevity.

The computing system 200 can include a host processor 202, a nonvolatile memory 204, a volatile memory 206, and a local memory controller 208. The computing system 200 is shown as an embodiment where the host processor 202 is on a different system card (not shown) than other devices. The computing system 200 is shown with the volatile memory 206, the nonvolatile memory 204, and the local memory controller 208 all on a storage card 220, in this example.

The storage card 220 provides storage capability to the computing system 200, to the host processor 202, or a combination thereof. A reserve power source 218 can be on the storage card 220. As an example, the local memory controller 208 can perform the adaptive back-up from the volatile memory 206 to the nonvolatile memory 204, described more in FIGS. 6, 7, and 8.

In this example, the storage card 220 has a number of devices for the volatile memory 206 as well as for the nonvolatile memory 204. Examples for the storage card 220 can be a plug-in card, a mezzanine card, or a line card. As a specific example, the storage card 220 can be a nonvolatile dual in-line memory module (NVDIMM) and the local memory controller 208 can be the nonvolatile memory controller for the NVDIMM.

FIG. 2 also depicts some example details for an embodiment of the local memory controller 208 according to the invention. The local memory controller 208 can include a processor core 222, a local buffer 224, data reliability circuitry 226, a volatile memory interface 228, and a nonvolatile memory interface 230. FIG. 2 also depicts a normal data path 232 and a power saving path 234.

The processor core 222 can provide at least some controls for the operation of the storage card 220. Examples of the processor core 222 can be a general purpose processing core, a finite state machine, a specialized writeable control store, or a combination thereof. The processor core 222 can be a single core or multiple cores of the same or different types.

The local buffer 224 can provide intermediary storage for the data being transferred between the volatile memory 206 and the nonvolatile memory 204. The local buffer 224 can also compensate for differences in transfer rate between the volatile memory 206 and the nonvolatile memory 204. The local buffer 224 can also provide at least some of the formatting differences between how data is stored between the volatile memory 206 and the nonvolatile memory 204. The processor core 222 also can provide at least some of the translation in the differences in format. Examples of a local buffer 224 can include a first in first out (FIFO) buffer, bidirectional shift registers, an internal RAM, or a combination thereof.

The data reliability circuitry 226 provides functions for error detection, error correction, or a combination thereof for the data being transferred between the volatile memory 206 and the nonvolatile memory 204. The functionality of the data reliability circuitry 226 can depend on whether the data being transferred includes some data protection scheme as part of the data format being transferred.

As examples, the data reliability circuitry 226 can provide protection with block codes, convolution codes, parity codes, or a combination thereof. The data reliability circuitry 226 can also operate on systematic codes or nonsystematic codes. Examples of some protection schemes handled by the data reliability circuitry 226 can include for Reed-Solomon (RS), Low Density Parity Check (LDPC), cyclic redundancy check (CRC), or a combination thereof.

The local memory controller 208 can assist in the data transfer between the volatile memory 206 and the nonvolatile memory 204. The data transfer can also be assisted or operated by the processor core 222. As an example, the data transfer can be between the volatile memory interface 228 and the nonvolatile memory interface 230 through the normal data path 232.

The normal data path 232 is for data transfer in normal operation. Normal operation refers to operation of the computing system 200, or as a more specific example the storage card 220, without detecting the power failure 114 of FIG. 1. For example, the normal data path 232 can include traversing through the local buffer 224 and the data reliability circuitry 226. The normal data path 232 can refer to the data path within and outside the local memory controller 208.

The volatile memory interface 228 provides functions for data transfer to and from the volatile memory 206. For example, the volatile memory interface 228 can provide the protocol and physical input/output interface to interact with the volatile memory 206. As a further example, the volatile memory interface 228 can also provide formatting functions so the data can be written to or retrieved from the volatile memory 206.

The nonvolatile memory interface 230 provides functions for data transfer to and from the nonvolatile memory 204. For example, the nonvolatile memory interface 230 can provide the protocol and physical input/output interface to interact with the nonvolatile memory 204. As a further example, the nonvolatile memory interface 230 can also provide formatting functions so the data can be written to or retrieved from the nonvolatile memory 204.

Turning to the situation where the storage card 220 detects the power failure 114, in some example embodiments, the local memory controller 208 or as a more specific example the processor core 222 can modify the data transfer from the volatile memory 206 to the nonvolatile memory 204 and potentially in the opposite direction. There are a number of ways to modify the data transfer when the power failure 114 is detected in order to ensure that no data is lost. Some of the modifications described herein can be for power savings, for increasing data transfer rates, or a combination thereof.

For example, the local memory controller 208 can perform the data transfer from the volatile memory interface 228 to the nonvolatile memory interface 230 through the power saving path 234. The power saving path 234 is a data path for the data transfer requiring less power for the data transfer than the normal data path 232. As examples, the power saving path 234 can be within the local memory controller 208 or can also include data path outside of the local memory controller 208.

The power saving path 234 can achieve lower power consumption in a number of ways. For example, the storage card 220 or the local memory controller 208 can operate with some of the circuitry in a low power mode. The low power mode can include shutting clocks to the block to eliminate logic transition thereby only leaving leakage current for power consumption in complementary metal oxide semiconductor (CMOS) technology. The low power mode can also include disabling a function of logic that can also result in eliminating logic transitions leaving only leakage current. Further, low power mode can also bypass some logic or circuitry so as to avoid execution of that circuitry, also allowing for elimination of electrical transitions. As in the example of the local memory controller 208, the data reliability circuitry 226 can be bypassed or not executed.

As another modification example, the storage card 220 or the local memory controller 208 can modify the transfer mechanism to write the data to the nonvolatile memory 204. The storage card 220 can modify the programming mode to allow a faster write mode 227 to the nonvolatile memory 204. The faster write mode 227 refers to writing to the nonvolatile memory 204 for increased programming or writing performance compared to other considerations. Examples of these considerations can be memory or storage density for multi-level cell (MLC) storage as opposed to single level cell (SLC) storage, which is described more in FIG. 5.

As a further modification example, the storage card 220 or the local memory controller 208 can modify the transfer mechanism from the volatile memory 206. As an example, the storage card 220 can program the volatile memory 206 to transfer in burst mode or full burst mode instead of byte-to-byte mode or partial burst mode for faster transfer performance, as further described in FIG. 6. The storage card 220 can also disable any error correction circuitry (not shown) in the volatile memory 206, if supported, to improve transfer performance and to lower power consumption.

Figure 3:
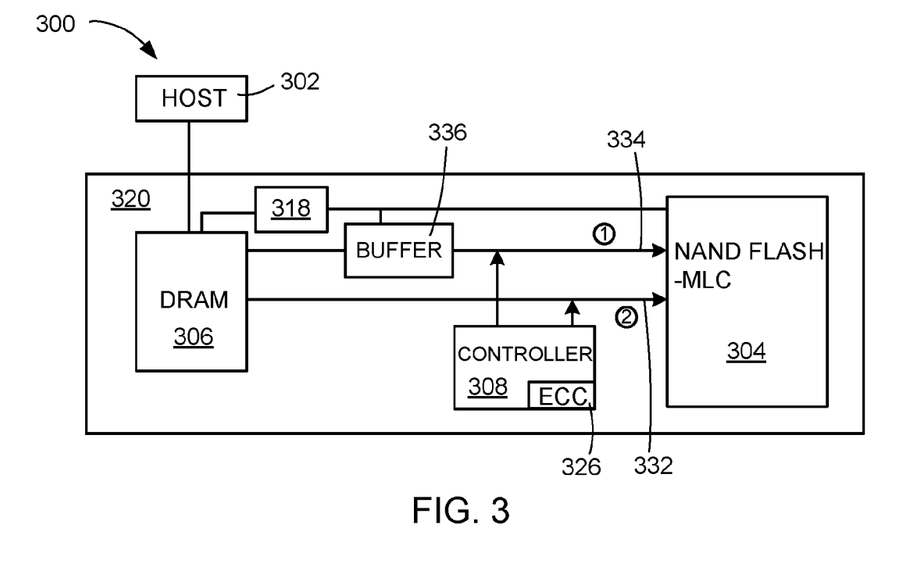
FIG. 3 is a computing system with an adaptive back-up mechanism in yet a further embodiment of the present invention.

Referring now to FIG. 3, therein is shown a computing system 300 with an adaptive back-up mechanism in yet a further embodiment of the present invention. The description for the computing system 100 of FIG. 1 and the computing system 200 of FIG. 2 also apply to the computing system 300. For this embodiment, the descriptions from FIG. 1 and FIG. 2 are applicable for elements with the same element name, even though the element can be labeled with a different element number. Much of the similarities are not repeated in this embodiment description for brevity.

The computing system 300 can include a host processor 302, a nonvolatile memory 304, a volatile memory 306, a local memory controller 308, and a buffer device 336. Similar to the computing system 200, the computing system 300 is shown as an embodiment where the host processor 302 is on a different system card (not shown) than other devices. The computing system 300 is shown with the volatile memory 306, the nonvolatile memory 304, and the local memory controller 308 all on a storage card 320, in this example.

In this embodiment, the buffer device 336 can be part of a power saving path 334 while the data path with the local memory controller 308 can be for a normal data path 332. When the storage card 320 or the computing system 300 detects the power failure 114 of FIG. 1, then the data transfer can occur through the power saving path 334 and through the buffer device 336, as an example. The normal data path 332 can include the functionalities of a data reliability circuitry 326 in the local memory controller 308.

The buffer device 336 can provide the intermediary storage for the data being transferred between the volatile memory 306 and the nonvolatile memory 304. The buffer device 336 can also compensate for differences in transfer rate between the volatile memory 306 and the nonvolatile memory 304. The buffer device 336 can also provide at least some of the formatting differences between how data is stored between the volatile memory 306 and the nonvolatile memory 304. Examples of the buffer device 336 can include a memory management device with a first in first out (FIFO) buffer, bidirectional shift registers, an internal RAM, or a combination thereof.

A reserve power source 318 can be connected to the buffer device 336, the volatile memory 306, the nonvolatile memory 304, or a combination thereof. The reserve power source 318 can optionally be not connected to the local memory controller 308 in this embodiment so as to avoid extraneous discharge. As described above, the reserve power source 318 provides the energy for backing up of data from the volatile memory 306 to the nonvolatile memory 304 that can be through the buffer device 336 and/or the power saving path 334. The data back-up during a power failure 114 would not involve operating the local memory controller 308 through the normal data path 332 if the reserve power source 318 is not connected to the local memory controller 308.

Figure 4:
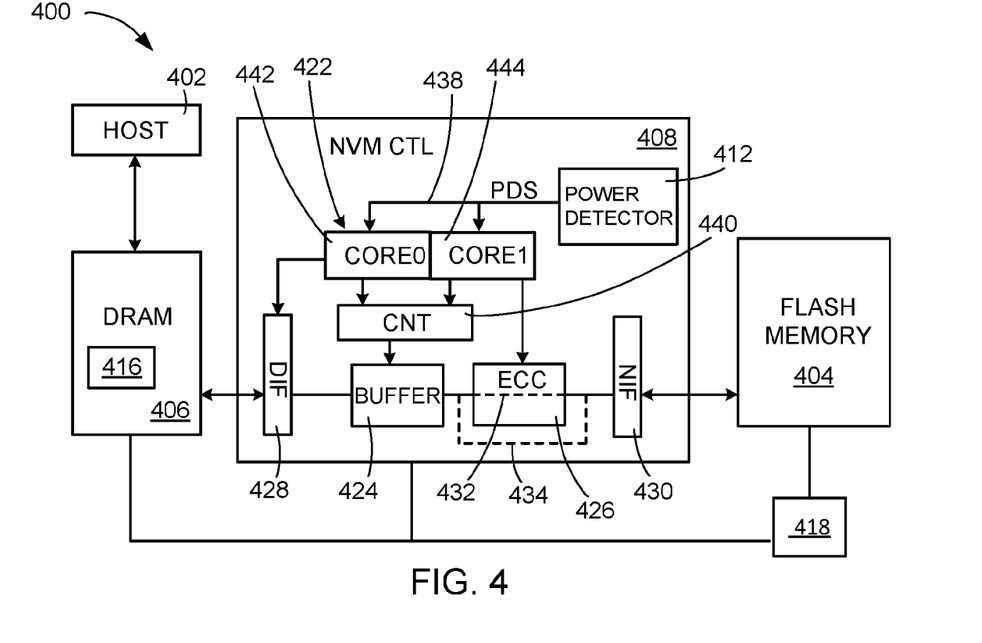
FIG. 4 is a computing system with an adaptive back-up mechanism in yet a further embodiment of the present invention.

Referring now to FIG. 4, therein is shown a computing system 400 with an adaptive back-up mechanism in yet a further embodiment of the present invention. The description for the computing system 100 of FIG. 1 and the computing system 200 of FIG. 2 also apply to the computing system 400. For this embodiment, the descriptions from FIG. 1 and FIG. 2 are applicable for elements with the same element name, even though the element can be labeled with a different element number. Much of the similarities are not repeated in this embodiment description for brevity.

The computing system 400 can include a host processor 402, a nonvolatile memory 404, a volatile memory 406, a local memory controller 408, and a reserve power source 418. The computing system 400 is shown as an embodiment where the host processor 402 can be on a different or the same system card (not shown) as the volatile memory 406, the nonvolatile memory 404, and the local memory controller 408.

The local memory controller 408 can include a power detector 412 for detecting the power failure 114 of FIG. 1 requiring at least a portion of the volatile data 416 to be backed-up to the nonvolatile memory 404. The power detector 412 can generate a power detect signal 438 indicating the power failure 114.

The local memory controller 408 can also include a processor core 422, a local buffer 424, data reliability circuitry 426, a volatile memory interface 428, a nonvolatile memory interface 430, and a counter 440. FIG. 4 also depicts a normal data path 432 and a power saving path 434. In this example, the power saving path 434 bypasses the data reliability circuitry 426 while the normal data path 432 includes the operation of the data reliability circuitry 426.

This embodiment depicts the processor core 422 including multiple cores referred to as a first core 442 and a second core 444 for convenience. The first core 442 is shown coupled to the volatile memory interface 428 and the counter 440. The second core 444 is shown coupled to the counter 440 and the data reliability circuitry 426.

As an example, the first core 442 can manage the data ingress, data egress, or a combination thereof relative to the volatile memory 406 and the local buffer 424. The first core 442 can help manage the data transfer based on the valid error detection, error correction, or a combination thereof from the data reliability circuitry 426 when the power detect signal 438 indicates that there is no power failure 114. The first core 442 can manage the data transfer without regard to the error detection or error correction from the data reliability circuitry 426 when the power detect signal 438 indicates that there is a power failure 114.

The second core 444 can control the operation or bypass of the data reliability circuitry 426 depending on the state of the power detect signal 438 indicating the power failure 114 or not. If the power failure 114 is not detected, the second core 444 can operate the data reliability circuitry 426 to release the data for the data transfer when the appropriate error detection, error correction, or a combination thereof operation has completed. If the power failure 114 is detected, the second core 444 can bypass the operation of the data reliability circuitry 426 to release the data for the data transfer from the volatile memory 406 to the nonvolatile memory 404 or vice versa.

The counter 440 can provide a tracking for the data transfer being released. The counter 440 can operate at a number of granularities. For example, the counter 440 can increment or decrement based on a symbol or byte level, a packet granularity based on the transfer protocol, or based on a predetermined data size.

As an example, the increment of the counter 440 can be based on data being transferred to the local buffer 424 and ready to be released. The decrement of the counter 440 can be based on the data being transferred when released from the local buffer 424. As a specific example, the first core 442 can increment the counter 440 and the second core 444 can decrement the counter 440.

The local memory controller 408 can operate with energy from the reserve power source 418 to data back-up from the volatile memory 406 to the nonvolatile memory 404 when there is a power failure 114. However, the functionality of the local memory controller 408 can differ than for data back-up when a power failure 114 is not detected.

For example, only one of the cores in the processor core 422 can operate for backing up the data to expend less energy from the reserve power source 418. Also for example, the counter 440 can also be operated without verification of data being backed up with the data reliability circuitry 426. The data reliability circuitry 426 can be put in low power mode, bypassed, or a combination thereof. The back-up can occur with the power saving path 434 bypassing the data reliability circuitry 426.

Figure 5:
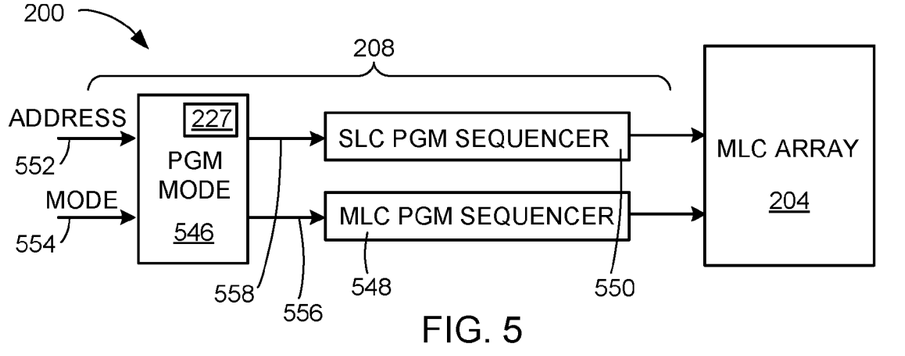
FIG. 5 is a detailed block diagram of a portion of the computing system.

Referring now to FIG. 5, therein is shown a detailed block diagram of a portion of the computing system 200. Although FIG. 5 is described with the embodiment in FIG. 2, it is understood that the description is not limited to the embodiment in FIG. 2.

FIG. 5 depicts a portion of the local memory controller 208 and the nonvolatile memory 204. FIG. 5 depicts one of the modifications for the adaptive back-up mechanism where the programming or writing to the nonvolatile memory 204 can be changed to a faster write mode 227.

The local memory controller 208 can include a program mode circuitry 546, a first mode sequencer 548, and a second mode sequencer 550. Although not shown in this figure, it is understood that the first mode sequencer 548, the second mode sequencer 550, or a combination thereof can be part of or interface to the nonvolatile memory interface 230 of FIG. 2.

The program mode circuitry 546 allows for the selection or setting of the write mode to the nonvolatile memory 204. The program mode circuitry 546 can receive an address 552 for the location of where to write the data into the nonvolatile memory 204. The address 552 can be a logical address or a physical address to the nonvolatile memory 204. The program mode circuitry 546 can translate the logical address from the address 552 to the physical address to the nonvolatile memory 204.

The program mode circuitry 546 can also receive an indication for a mode 554 for which the nonvolatile memory 204 should be written. In this example embodiment, the mode 554 can specify either the first mode sequencer 548 or the second mode sequencer 550 for programming or writing to the nonvolatile memory 204. The mode 554 can also be used by the program mode circuitry 546 for translating the address 552 from logical to physical, if necessary.

The first mode sequencer 548 provides the controls for programming the nonvolatile memory 204 in a first mode 556. As an example, the first mode 556 can be a multi-level cell (MLC) programming. The second mode sequencer 550 provides the controls for programming the nonvolatile memory in the second mode 558. As an example, the second mode 558 can be a SLC programming. In this example, the second mode sequencer 550 represents the faster write mode 227 compared to the first mode sequencer 548.

The first mode sequencer 548 and the second mode sequencer 550 can be implemented in a number of ways. For example, the first mode sequencer 548, the second mode sequencer 550, or a combination thereof can be implemented by circuitry, such as a finite state machine or other logic circuits.

Figure 6:
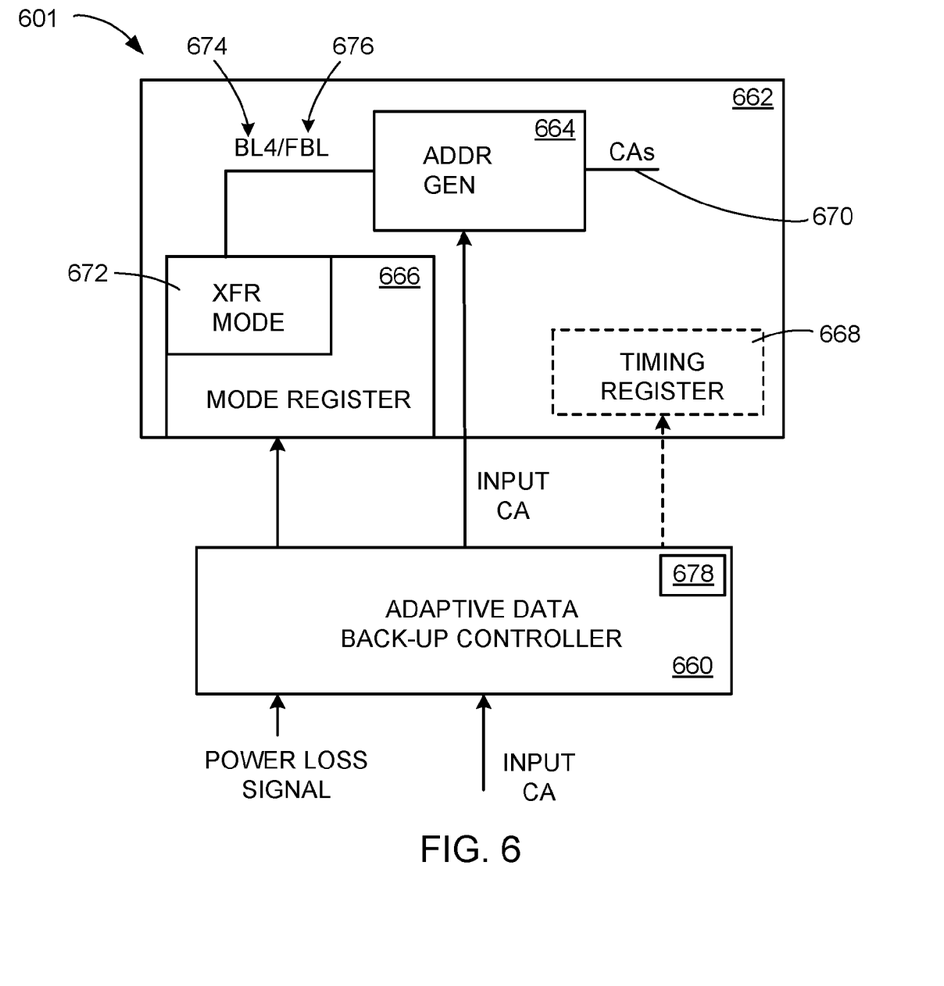
FIG. 6 is a detailed block diagram of the adaptive back-up system.

Referring now to FIG. 6, therein is shown a detailed block diagram of an adaptive back-up system 601. The adaptive back-up system 601 provides the adaptation of timing of storing data from the volatile memory 206 of FIG. 2 to the nonvolatile memory 204 of FIG. 2. The adaptive back-up system 601 also provides modification to the transfer mechanism for the volatile memory 206 for backing up data when the power failure 114 of FIG. 1 is detected.

The description for the adaptive back-up system 601 can also apply to the embodiments described for the computing system 100 of FIG. 1, the computing system 300 of FIG. 3, and the computing system 400 of FIG. 4 in addition to the computing system 200 of FIG. 2. Much of the similarities are not repeated in this description for brevity.

As examples, the adaptive back-up system 601 can be included in the volatile memory interface 228 of FIG. 2, the local buffer 224 of FIG. 2, the processor core 222 of FIG. 2, the nonvolatile memory interface 230 of FIG. 2, or a combination thereof. The adaptive back-up system 601 can be implemented in hardware circuitry, software, or a combination thereof.

For this example, the adaptive back-up system 601 can include an adaptive back-up controller 660 and an interface block 662. The interface block 662 provides the protocol support for memory access. In this example, the interface block 662 can provide protocol support for access to the volatile memory 206. The adaptive back-up controller 660 provides the adaptation of timing for the memory access.

In this embodiment, the interface block 662 can include an address generator 664, a transfer mode block 666, a timing block 668, or a combination thereof. The description for the adaptive back-up controller 660 is described in FIG. 7.

The address generator 664 provides memory addresses 670 for accessing memory. The transfer mode block 666 provides controls for a data transfer mode 672 for the memory access, such as the read or write transfer mode from the volatile memory 206. The timing block 668 provides a timing control for backing up the data from the volatile memory 206 to the nonvolatile memory 204.

The address generator 664 can be programmable. As examples, the adaptive back-up controller 660, the processor core 222, the host processor 202 of FIG. 2, or a combination thereof can program the address generator 664.

The address generator 664 can increment or decrement the memory addresses 670. The address generator 664 can increment or decrement with different granularities based on the data transfer mode 672. The transfer mode block 666 can determine the increment or decrement size to be larger or smaller. The address generator 664 can be implemented in a number of ways, such as a counter, a finite state machine, a programmable and an executable control store.

The transfer mode block 666 can be programmable. As examples, the adaptive back-up controller 660, the processor core 222, the host processor 202, or a combination thereof can program the data transfer mode 672 in the transfer mode block 666.

The data transfer mode 672 provides the transfer burst size for the memory access to the volatile memory 206. The data transfer mode 672 can specify that the memory access can be a specific value for a partial burst length 674 or can specify a full burst length 676. An example in this embodiment, the partial burst length 674 is less than the full burst length 676.

The timing block 668 can measure a time interval between backup events from the volatile memory 206 to the nonvolatile memory 204 for normal operation. The timing block 668 can be programmable. As examples, the adaptive back-up controller 660, the processor core 222, the host processor 202, or a combination thereof can program an adaptive back-up time 678 in the timing block 668. The timing block 668 can also be part of the adaptive back-up controller 660.

The adaptive back-up time 678 provides a dynamic timing for backing up the volatile memory 206 to the nonvolatile memory 204. The adaptive back-up time 678 is dynamic because it is not constrained to a fixed periodic timing. The adaptive back-up time 678 can be adjusted by the adaptive back-up controller 660 based on a number of factors, which is described in FIG. 7. The adaptive back-up 678 is used for backing up data from the volatile memory 106 to the nonvolatile memory 104 of FIG. 1 during normal operation or without detecting the power failure 114.

Figure 7:
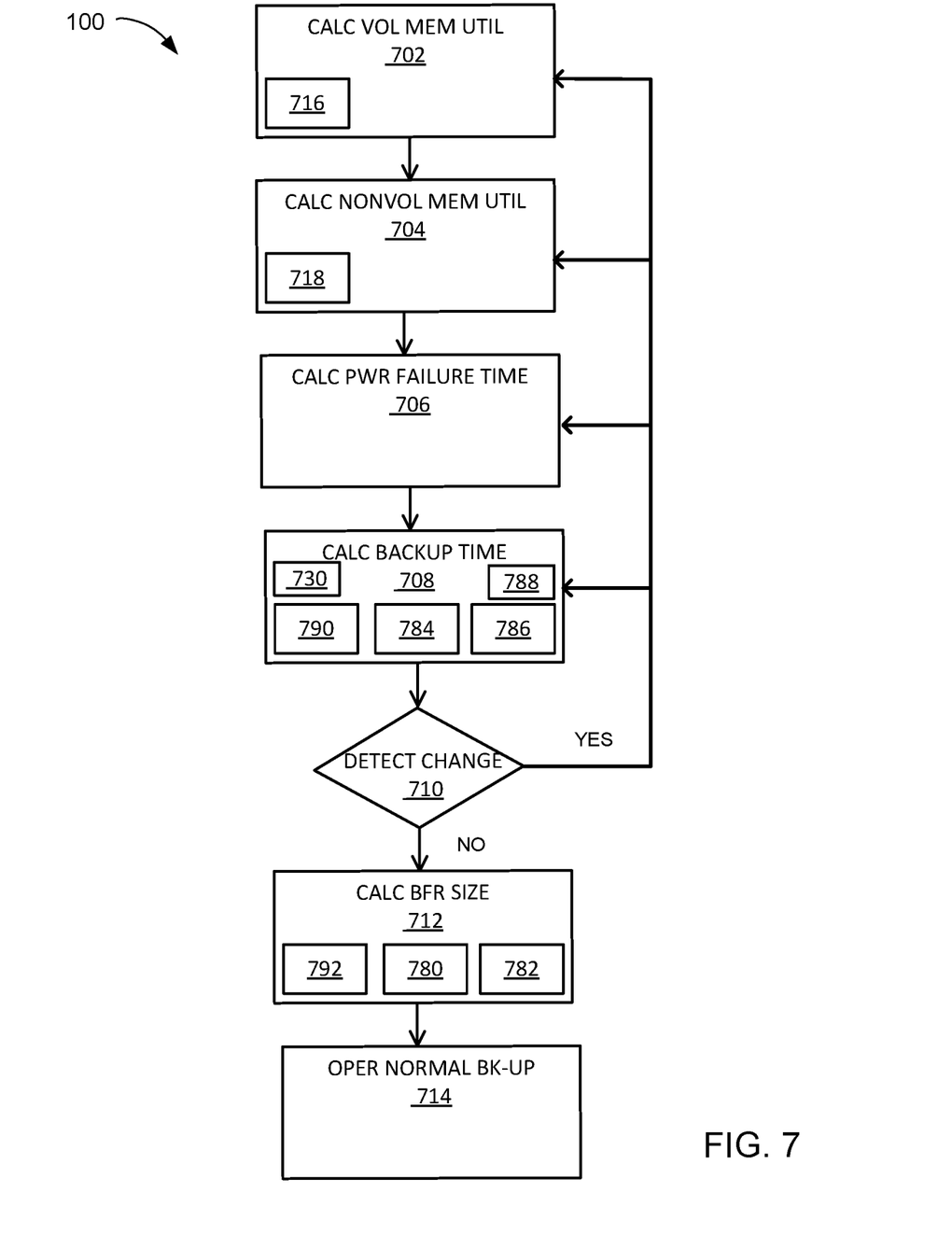
FIG. 7 is a control flow for a normal operation for an adaptive back-up for the computing system.

Referring now to FIG. 7, therein is shown a control flow for a normal operation for an adaptive back-up for the computing system 100. The description for FIG. 7 also applies for the computing system 200 of FIG. 2, the computing system 300 of FIG. 3, and the computing system 400. Much of the similarities are not repeated in this embodiment description for brevity.

As noted in FIG. 6, the calculation of the adaptive back-up time 678 of FIG. 6 is based on factors. As an example for an embodiment, the factors can include:

Current write buffer occupancy: wr_buf_occ (referred to as a write buffer occupancy 780)

Write buffer entry size: wr_buf_entry_size (referred to as a write entry size 782)

NVM internal write bandwidth: nvm_wr_bw (referred to as a nonvolatile bandwidth 784)

NVM internal write latency: nvm_wr_lat (referred to as a nonvolatile latency 786)

External NVDIMM write throughput: nvdimm_wr_thput (referred to as a nonvolatile throughput 788)

Time to total power failure: time_to_power_loss (referred to as an available back-up time 790)

Based on these factors, the adaptive back-up controller 660 of FIG. 6 can compute:

Time to next data backup: time_to_next_databackup (referred to as the adaptive back-up time 678)

Write buffer entries to commit at current interval: wr_buf_entries_to_commit (referred to as a write entries commit 792)

The write entries commit 792 represents the amount of data backed up from the volatile memory 106 within or at the adaptive back-up time 678, as described more thoroughly later.

As an example, the adaptive back-up controller 660 can process the factors with a calculate volatile memory utilization module 702, a calculate nonvolatile memory utilization module 704, a calculate power failure time module 706, a calculate back-up time module 708, a detect change module 710, a calculate buffer size module 712, and an operate normal back-up module 714. The flow can progress from one module to the other as depicted in FIG. 7, although it is understood that this is shown as an example.

The calculate volatile memory utilization module 702 determines the power consumption for memory access with the volatile memory 106. The calculate nonvolatile memory utilization module 704 determines the power consumption for memory access with the nonvolatile memory 104. The calculate power failure time module 706 determines the amount of time available for the data transfer between the volatile memory 106 and the nonvolatile memory 104 based on a charge capacity in the reserve power source 118 of FIG. 1. The calculate back-up time module 708 determines the back-up time during normal operation.

The detect change module 710 monitors or detects conditions that can affect backing up the data from the volatile memory 106 to the nonvolatile memory 104. The calculate buffer size module 712 determines the amount of data in the volatile memory 106 to be backed up. The operate normal back-up module 714 executes the adaptive back-up of the volatile memory 106.

The calculate volatile memory utilization module 702 determines the power consumption for memory access in a number of ways. For example, the determination of a source consumption 716 can be based on the data transfer mode 672 for the volatile memory 106. The source consumption 716 is the power consumption for accessing the volatile memory 106 as the source of data to be the backed up. The source consumption 716 can vary based on the data transfer mode 672. The source consumption 716 can be less for smaller burst size per burst, however, the smaller burst size can lead to an overall larger power consumption to complete the back-up. As an example, the source consumption 716 can be less when the data transfer mode 672 is set for full burst length 676 of FIG. 6 rather than partial burst length 674 of FIG. 6.

As a further example, the determination for the source consumption 716 can be based on the physical interface of the volatile memory 106. The source consumption 716 can vary based on a read or write access to the volatile memory 106. The source consumption 716 can also vary based on the electrical levels for the input/output of the volatile memory 106. The higher values for the electrical voltage levels or the current requirements are for the input/output, the higher the source consumption 716.

The calculate nonvolatile memory utilization module 704 can similarly calculate the power consumption for access to the nonvolatile memory 104 as done with the calculate volatile memory utilization module 702. A target consumption 718 is the power consumption for accessing the nonvolatile memory 104 as the target of data to be backed up. For example, the determination of the target consumption 718 can be based on the faster write mode 227 of FIG. 2 for the nonvolatile memory 104. As a further example, the determination for the target consumption 718 can be based on the physical interface of the nonvolatile memory 104. The target consumption 718 can vary based on a read or write access to the nonvolatile memory 104. The target consumption 718 can also vary based on the electrical levels or current requirements for the input/output of the nonvolatile memory 104.

The calculate power failure time module 706 can be used to determine the available back-up time 790 to back-up data from the volatile memory 106 to the nonvolatile memory 104 based on the charge remaining in the reserve power source 118. The available back-up time 790 is the amount of time available for a backing up the volatile memory 106 to the nonvolatile memory 104 based on the remaining charge in the reserve power source 118 of FIG. 1. The determination of the available back-up time 790 can be done in a number of ways.

For example, the determination can be calculated also based on the amount of data that needs to be backed up and the power consumption by the volatile memory 106 and the nonvolatile memory 104. The source consumption 716 can provide information on how much charge from the reserve power source 118 will be expended when moving the data from the volatile memory 106 for back-up. The target consumption 718 can provide information on how much charge from the reserve power source 118 will be expended when writing the data to the nonvolatile memory 104 for back-up.

The determination can also include other factors. For example, the power consumption of the local memory controller 108 of FIG. 1 or the utilization of the normal data path 232 of FIG. 2 or the power saving path 234 of FIG. 2. As described earlier, the power consumption for backing up data can vary depending on transferring the data with the normal data path 232 of FIG. 2 or the power saving path 234 of FIG. 2 or through the data reliability circuitry 226 of FIG. 2. Further, other factors can impact the power consumption for backing up the data including other devices that can be part of the data path performing the back-up function. Examples of the other devices can be the local memory controller 108 of FIG. 1.

The calculate back-up time module 708 determines the adaptive back-up time 678. As noted earlier, the adaptive back-up time 678 is dynamically adjusted and calculated based on factors. As examples, the factors can include the nonvolatile bandwidth 784, the nonvolatile latency 786, the nonvolatile throughput 788, the available back-up time 790, or a combination thereof.

The nonvolatile bandwidth 784 represents the data transfer rate for programming or writing to the nonvolatile memory 104. The nonvolatile bandwidth 784 can be based on factors. For example, the faster write mode 227, voltage levels, and environmental conditions can affect the nonvolatile bandwidth 784.

The nonvolatile latency 786 represents the delay in writing data to the nonvolatile memory 104. The nonvolatile latency 786 can represent the delay for the entire data to be backed up to the nonvolatile memory 104 or a portion of it.

The nonvolatile throughput 788 represents an external programming or write throughput for writing to the nonvolatile memory 104. The term external refers to the data path from the host processor 102 of FIG. 2. In the embodiment illustrated in FIG. 2, the external portion would be the data path from the host processor 102 to the volatile memory 106 of FIG. 2.

The adaptive back-up time 678 can be calculated as follows:

$$\text{time\_to\_next\_databackup}=[(\text{time\_to\_power\_loss}-\text{nvm\_wr\_lat})*\text{nvm\_wr\_bw}]/\text{nvdimm\_wr\_thput} \quad \text{(Equation 1)}$$

Equation 1 for the adaptive back-up time 678 can be expressed also as:

$$\text{adaptive back-up time 678}=[(\text{available back-up time 790}-\text{nonvolatile latency 786})*\text{nonvolatile bandwidth 784}]/\text{nonvolatile throughput 788} \quad \text{(Equation 1)}$$

The computing system 200 can back-up the data from the volatile memory 106 to the nonvolatile memory 104 during normal operation within or at the adaptive back-up time 678 as calculated by Equation 1. The adaptive back-up time 678 can be dynamically adjusted based on changes to the remaining charge capacity in the reserve power source 118 as expressed through the available back-up time 790.

In this example, Equation 1 also considers the delay to write to the nonvolatile memory 104 through the nonvolatile latency 786. Equation 1 also provides a ratio of backing up the existing data in the volatile memory 106 with the nonvolatile bandwidth 784 while considering receiving more data into the volatile memory 106 with the nonvolatile throughput 788. Accounting for this ratio allows the computing system 200 to guarantee that no data is lost when the power failure 114 is detected.

As a further example, the computing system 100 can provide a back-up priority 730. The back-up priority 730 can be used to identify what type or what portion from the volatile data 116 of FIG. 1 in the volatile memory 106 should be backed up to the nonvolatile memory 104 before other types or portions of the volatile data 116 that were not identified by the back-up priority 730.

The back-up priority 730 can be implemented in a number of ways. For example, the back-up priority 730 can represent a single tier priority mechanism. The single tier can allow the back-up priority 730 to identify at least a type or a portion of the volatile data 116 to be prioritized above other types or portions of the volatile data 116 where the back-up priority 730 has not been set or has not been identified by the back-up priority 730.

As a further example, the back-up priority 730 can be a multi-tier mechanism. In this example, the back-up priority 730 can provide different levels of importance of which types or portions of the volatile data 116 to be backed up before lower tiers or the non-identified types or portions during the available back-up time 790.

Also for example, the back-up priority 730 can be set based on system functions for the computing system 100 as a type of volatile data 116. Examples of types for the volatile data 116 can include data for housing cleaning or system maintenance (garbage collection), storage system maintenance, programming functions as erase before writing to the non-volatile memory 104 not related to the back-up, cache data, or a combination thereof. As specific examples, the back-up priority 730 can increase the importance of backing up critical user data or application data over general system maintenance data. As another specific example, dirty data in the cache data can be prioritized over the non-updated data in the cache data. As a further specific example, some system data can be view more important than others. For example, data relating to an operating system of the computing system 100 can be set to be higher importance with the back-up priority 730 than application data.

The computing system 100 can set the back-up priority 730 to increase the importance of certain volatile data 116 while reducing or even foregoing backing up of other volatile data 116. As an example, the computer system 100 can use the back-up priority 730 to increase the importance of backing up certain types or portions of user data, application data, or a combination thereof. For example, other volatile data 116 that are lower priority may not be backed-up during the available back-up time 790 during the power failure 114 of FIG. 1 or may be backed-up only after the volatile data 116 that has been identified as high priority with the back-up priority 730 has been backed-up.

Further for example, the computing system 100 can set the back-up priority 730 to prioritize the type of the volatile data 116 providing cache data for the computing system 100. Cache data are used to provide faster access for the processing engine, such as host processor 102 of FIG. 1, the local memory controller 108 of FIG. 1, the host memory controller 110 of FIG. 1, or a combination thereof. More particularly, the back-up priority 730 can be used to identify the dirty data in the cache data of the volatile data 116. Dirty data represents data that has changed between what is part of the volatile data 116 and what is stored elsewhere whereby the volatile data 116 is serving the cache data. Giving priority to the dirty cache data over clean cache data or non-updated data can ensure that changes made to the contents of a data set (the dirty cache lines) are backed up before cache lines that do not represent changes to the data (clean cache lines), thereby better protecting system integrity.

Continuing the example with the back-up priority 730, the computing system 100 can set the back-up priority 730 to effectively deprioritize some types or portions of the volatile data 116. As discussed earlier, the back-up priority 730 can be used to prioritize user data, application data, cache data, dirty portion of the cache data, or a combination thereof.

The back-up priority 730 can select one or more of these types of data when functioning as a single tier priority mechanism. The back-up priority 730 can select a number of these types of data and set a priority among them when the back-up priority 730 is functioning as a multi-tier priority mechanism.

In effect, through the act of setting the back-up priority 730, other types or portions of the volatile data 116 can be deselected (or de-emphasized) from being backed up during the power failure 114. Alternatively, the back-up priority 730 can affirmatively deselect the identified data of the volatile data 116 not to be backed up in the available back-up time 790 or the computing system 100 can separately set the non-identified volatile data 116 not to be backed-up during the power failure 114.

Further, the computing system 100 can elect to pause background processes during the available back-up time 790 and during the power failure 114. As a specific example, the computing system 100 can select not to perform performing cleaning functions such as garbage collection, erase functions to the non-volatile memory 204 not involved in the back-up, or a combination thereof. Further, the computing system 100 can pause background processes separately from and unrelated to the back-up priority 730, or that can be affected or set by the back-up priority 730.

As specific examples, the host processor 102, the local memory controller 108, the host memory controller 110, or a combination thereof can program the values for the back-up priority 730.

As a further example, if the power failure 114 of FIG. 1 is detected, the local memory controller 108 can notify the external system, such as the host processor 102, from sending additional data to the volatile memory 106. In this situation, Equation 1 can be simplified to an expression without the ratio of the nonvolatile bandwidth 784 and the nonvolatile throughput 788. As a different example, the ratio of the nonvolatile bandwidth 784 and the nonvolatile throughput 788 can be set to 1 in Equation 1. The ratio of the nonvolatile bandwidth 784 and the nonvolatile throughput 788 can be dynamic and change in value.

It has been discovered that embodiments prevent or eliminate data loss when there is a power failure 114 because the embodiments adaptively control the time intervals of normal data back-up modes to guarantee that all data is backed up before total power failure. Embodiments calculate the available back-up time 790 available to the reserve power source 118 for the given conditions present for backing up the data from the volatile memory 106. Embodiments can calculate the adaptive back-up time 678 based on the available back-up time 790. The adaptive back-up time 678 helps control the back-up of the volatile memory 106 to the nonvolatile memory 104 during normal operation, e.g. without power failure 114.

The detect change module 710 determines changes to the computing system 200 affecting the adaptive back-up mechanism. As an example, the detect change module 710 can monitor the remaining charge in the reserve power source 118. The reserve power source 118 can discharge reducing the available back-up time 790. This change can cause the adaptive back-up time 678 to be adjusted and recalculated. As an example, the flow can loop back to the calculate back-up time module 708.

As a further example, if the power failure 114 was detected and a portion of the charge in the reserve power source 118 was used to back-up the volatile memory 106 and then power is restored, there remaining charge in the reserve power source 118 has been reduced. This example would also reduce the available back-up time 790. This can also require an adjustment or recalculation of the adaptive back-up time 678 for normal operation. As an example, the flow can loop back to the calculate power failure time module 706. The computing system 100 can halt storage system background maintenance functions such as garbage collection and defragmenting memory so as to preserve the reserve power source 118 during the power failure 114. The storage system maintenance functions are storage system functions that generally can be used to increase or optimize performance of a storage system, but are not immediately essential for the operation of the computing system 100. As an example, one of the effects of halting the storage system background maintenance functions is increasing the available back-up time 790.

Other environmental changes can affect the adaptive back-up time 678. For example, changes to the voltage supply to the volatile memory 106, the nonvolatile memory 104, the local memory controller 108, or a combination thereof can affect the values for the nonvolatile bandwidth 784, the nonvolatile throughput 788, or a combination thereof. This change can also require an adjustment or recalculation of the adaptive back-up time 678. As an example, the flow can loop back to the calculate volatile memory utilization module 702, the calculate nonvolatile memory utilization module 704, or a combination thereof.

It has been discovered that embodiments further prevent or eliminate data loss when there is a power failure 114 because the embodiments dynamically adjust the time intervals of the normal data back-up modes to guarantee all data can be backed up before total power failure. Embodiments adjust the available back-up time 790 by the reserve power source 118 when conditions influencing the ability to back-up the data change. The available back-up time 790 is dynamically adjusted as the reserve power source 118 discharges or is utilized when a power failure 114 has been detected. The available back-up time 790 can further be dynamically adjusted if the reserve power source 118 can be at least partially recharged. Embodiments can adjust the adaptive back-up time 678 based on adjustments to the available back-up time 790 of the reserve power source 118. The dynamic adjustments to the adaptive back-up time 678 allow it to be variable as opposed to a fixed time interval. The dynamic adjustments to the adaptive back-up time 678 further help control the back-up of the volatile memory 106 to the nonvolatile memory 104 during normal operation while avoiding data loss when power failure 114 is detected.

Also for example, the detect change module 710 can utilize the back-up priority 730 to determine changes affecting the adaptive back-up mechanism. As an example, if the back-up priority 730 is set to prioritize only a particular type of volatile data 116, this impacts the amount of data to be backed up, therefore the flow can loop back to the calculate volatile memory utilization module 702 to calculate the volatile memory 206 of FIG. 2 used by priority data, to the calculate nonvolatile memory utilization module 704 to determine if there is sufficient space to back-up the prioritized data, and to the calculate back-up time module 708 to calculate if there is enough power to back-up the priority data, or a combination thereof.

Further, the pausing or stopping of storage system background maintenance functions of the computing system 100 can increase the amount of energy available for back-ups, and eliminating the need to back-up de-prioritized data can reduce the amount of the volatile data 116 needing to be backed up. As another example, utilizing the back-up priority 730 to select only the cache data in the volatile data 116 can also reduce amount of the volatile data 116 needing to be backed up. Further for example, the back-up priority 730 can be used to selected only the dirty portion of a cache data from the volatile data 116 can yet further reduce the amount of the volatile data 116 needing to be backed up. The calculate buffer size module 712 can determine the amount of data in the volatile memory 106 to be backed up in normal operation. As an example, the calculate buffer size module 712 can calculate a write entries commit 792, which is the amount of data to back-up from the volatile memory 106 within or at the next adaptive back-up time 678. This ensures that the remaining charge in the reserve power source 118 can back-up the remaining data in the volatile memory 106 without loss of data when the power failure 114 is detected.

The calculate buffer size module 712 can make this determination based on a number of factors. As examples, the factors can include the write buffer occupancy 780, the write entry size 782, the nonvolatile bandwidth 784, the nonvolatile latency 786, the available back-up time 790. As an example, the write entries commit 792 can be calculated as follows:

$$wr\_buf\_entries\_to\_commit = wr\_buf\_occ - \{[(time\_to\_power\_loss - nvm\_wr\_lat)*nvm\_wr\_bw]/wr\_buf\_entry\_size\} \quad \text{(Equation 2)}$$

Equation 2 for the write entries commit 792 can be expressed also as:

write entries commit 792=write buffer occupancy 780−{[(available back-up time 790−nonvolatile latency 786)*nonvolatile bandwidth 784]/write entry size 782}

As a specific example, the write entries commit 792 represents the number of entries to commit to back-up from the volatile memory 106 within or at the next adaptive back-up time 678. The write buffer occupancy 780 represents the number of entries in the volatile memory 106 with data that can be potentially backed up. The write entry size 782 represents the size for each of the entries. The write entry size 782 can be expressed in a number of ways, such as an absolute value in physical memory size or a percentage of the total size for the volatile memory 106.

The write entries commit 792, the write buffer occupancy 780, or a combination thereof can also be affected by the back-up priority 730. The computing system 100 can utilize the back-up priority 730 to verify the amount of space in the non-volatile memory 204 is available to accommodate the write buffer occupancy 780. Also, the computing system 100 can verify or prepare the non-volatile memory 204 with sufficient space for the write buffer occupancy 780 without requiring erase cycles during the available back-up time 790 for the power failure 114. The computing system 100 can also calculate or predict the amount needed in the non-volatile memory 204 for the write buffer occupancy 780. The computing system 100 can calculate or predict the amount needed in the non-volatile memory 204 in a number of ways. For example, as the computing system 100 operates, as the back-up priority 730 selects particular types of data to be backed up, if the computing system 100 projects or estimates that type of data utilization in the volatile memory 206, then the size of the write entries commit 792, the write occupancy 780, or a combination thereof of this type of data can be calculated to predict the amount of space that is needed in the non-volatile memory 204.

Equation 2 takes into account the available back-up time 790 relative to the nonvolatile latency 786. As an example, the nonvolatile latency 786 is subtracted from the available back-up time 790 because of the delay for backing up data. In addition to the delay, Equation 2 also considers the speed of how fast the data can be backed up with the nonvolatile bandwidth 784. The calculation for how fast the data can be backed up also considers the size of the write entries in the volatile memory 106 with the write entry size 782.

Equation 2 then subtracts the result from the above calculations from the number of write buffers occupying the volatile memory 106 that can be potentially backed-up with the write buffer occupancy 780. The result of this latter subtraction results in the write entries commit 792 in the volatile memory 106 to commit to the next back-up at the adaptive back-up time 678.

The operate normal back-up module 714 performs the back-up of the data from the volatile memory 106 at the adaptive back-up time 678. The operate normal back-up module 714 can perform data back-up when the adaptive back-up time 678 has been reached or triggered. The operate normal back-up module 714 can perform with the timing function in a number of ways. For example, the timing block 668 of FIG. 6 or a timer function in the local memory controller 108 can provide the timer function. Also as an example, the host processor 102 can provide the timer function.

When the adaptive back-up time 678 has been reached or triggered, the operate normal back-up module 714 can back-up the volatile memory 106 and the amount of data to be backed up at this particular back-up event is determined by the write entries commit 792. The adaptive back-up time 678 can be triggered more than once during normal operation as long as a power failure 114 is not detected. Although the adaptive back-up time 678 is not necessarily a fixed time interval, it can provide a time interval for backing up data during normal operation and can be adjusted.

The adaptive back-up time 678 can be dynamically adjusted such that the operate normal back-up module 714 can perform the back-up of the volatile memory at varying or non-fixed timing or period. Also, adjustments to the adaptive back-up time 678 can also modify or update the write entries commit 792. These functions ensures that enough data is backed up to the nonvolatile memory 104 such that when the power failure 114 is detected, the amount of data in the volatile memory 106 that needs to be backed up can be completed with the remaining charge in the reserve power source 118.

It has been discovered that embodiments yet further prevent or eliminate data loss when there is a power failure 114 because the embodiments adaptively control the amount of data from the volatile memory 106 to be backed up during normal data back-up mode to guarantee all data is backed-up before total power loss. The embodiments calculate or adjust the available back-up time 790 and the adaptive back-up time 678. The embodiments can calculate how much data from the volatile memory 106 needs to be backed-up in normal operations with the write entries commit 792, and therefore can schedule back-ups to ensure that data will not be lost when a power failure 114 is detected, and the back-up process is based on the remaining charge in the reserve power source 118. The embodiments can adjust the available back-up time 790 and the adaptive back-up time 678. The embodiments can also adjust how much data from the volatile memory 106 needs to be backed-up in normal operations with adjustments to the write entries commit 792 to ensure that data will not be lost when power failure 114 is detected, and the back-up process is based on the remaining charge in the reserve power source 118.

It has been further discovered that the back-up priority 730 can be utilized to select types or portions from the volatile data 116 to be backed up to the non-volatile memory 204. The back-up priority 730 can provide a single tier priority mechanism or a multi-tier priority mechanism. Embodiments can further operate to pause or stop system tasks not identified by the back-up priority 730.

Figure 8:
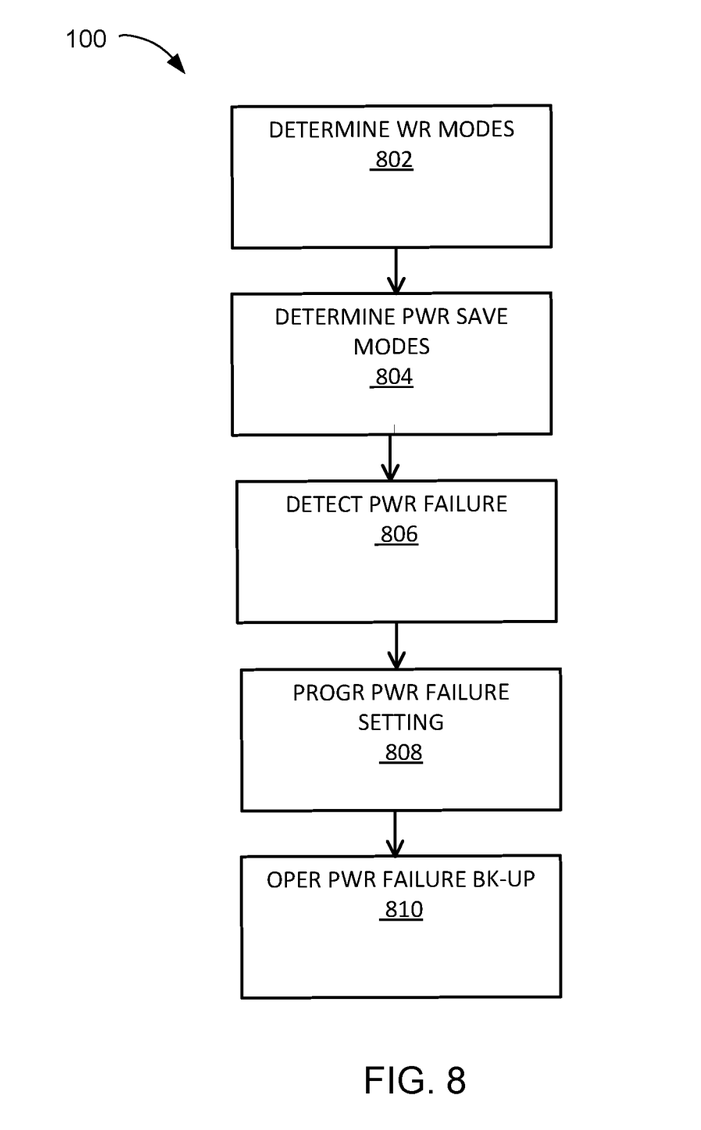
FIG. 8 is a control flow for a power failure operation for the adaptive back-up for the computing system.

Referring now to FIG. 8, therein is a control flow for a power failure operation for the adaptive back-up for the computing system 100. The description for FIG. 8 also applies for the computing system 200 of FIG. 2, the computing system 300 of FIG. 3, and the computing system 400 of FIG. 4. Much of the similarities are not repeated in this embodiment description for brevity. In the example in FIG. 8, the control flow can include a determine write modes module 802, a determine power save modes module 804, a detect power failure module 806, a program power failure setting module 808, and a operate power failure back-up module 810.

The determine write modes module 802 determines the available modes to program the nonvolatile memory 104. For example, the determine write modes module 802 detects or extracts the available modes to program or write to the nonvolatile memory 104. Also, the determine write modes module 802 can also calculate which of the available modes is faster or more power efficient to write or program the nonvolatile memory. As an example, the determine write modes module 802 can determine whether the faster write mode 227 of FIG. 2 exists and if so, which is most efficient for the back-up when power failure 114 is detected.

The determine power save modes module 804 determines the availability of power saving features for the back-up process. For example, the determine power save modes module 804 detects or extracts if the power saving path 234 of FIG. 2 exists or if the computing system 100 is constrained to the normal data path 232. As examples, this power saving determination can be made for the local memory controller 108 of FIG. 1, the data reliability circuitry 226 of FIG. 2, the buffer device 336 of FIG. 3, the host processor 102 of FIG. 1, or the interaction with the host processor 102.

The detect power failure module 806 determines if a power failure event has occurred that can cause data loss from the volatile memory 106. Data loss does not necessarily include data reliability. The detect power failure module 806 can determine if the power failure 114 has been detected thereby potentially interrupting the normal operation of the computing system 100 and the back-up process for normal operation at the adaptive back-up time 678 of FIG. 6.

The program power failure setting module 808 provides the setting of the computing system 100 for backing up the volatile memory 106. For example, the program power failure setting module 808 can program the nonvolatile memory 104 with the appropriate value for the faster write mode 227 of FIG. 2 for programming or writing to the nonvolatile memory 104 that is most efficient for backing up data with the reserve power source 118 of FIG. 1. Also for example, the program power failure setting module 808 can also determine the appropriate power saving path 234 to utilize for backing up data with the reserve power source 118. Further for example, the program power failure setting module 808 can set the appropriate value for the data transfer mode 672 of FIG. 6 for transferring data from the volatile memory 106 for back-up with the reserve power source 118.

The operate power failure back-up module 810 performs the back-up of the volatile memory 106 when the power failure 114 has been detected. The operate power failure back-up module 810 continues to back-up the volatile memory 106 while the power failure 114 condition exists until the volatile memory 106 back-up is complete or the power failure 114 condition no longer exists, where normal operation can resume. If normal operation resumes from a condition of power failure 114, the adjustments to the adaptive back-up time 678 of FIG. 7 and the write entries commit 792 of FIG. 7 can be made.

The operate power failure back-up module 810 can perform the back-up from the volatile memory 106 to the nonvolatile memory 104 based on the settings from the program power failure setting module 808. For example, the transfer from the volatile memory 106 can be with the data transfer mode 672 as the full burst length 676 of FIG. 5. Also for example, the nonvolatile memory 104 can be programmed or written with the faster write mode 227 set to SLC. Further for example, the power saving path 234 can be utilized instead of the normal data path 232 including bypassing the data reliability circuitry 226.

It has been discovered that embodiments prevent or eliminate data loss when there is a power failure 114 because the embodiments improve the back-up of the volatile memory 106 with settings to help avoid loss of the desired data in the volatile memory 106. Embodiments can transfer data from the volatile memory 106 in full burst length 676 to improve efficiency of backing up data during the power failure 114. Also, embodiments can improve efficiency of backing up the data to the nonvolatile memory 104 by writing to the nonvolatile memory 104 in the faster write mode 227. Further, embodiments can improve backing up the data by transferring the data through the power saving path 234 instead of the normal data path 232 during the power failure 114.

Figure 9:
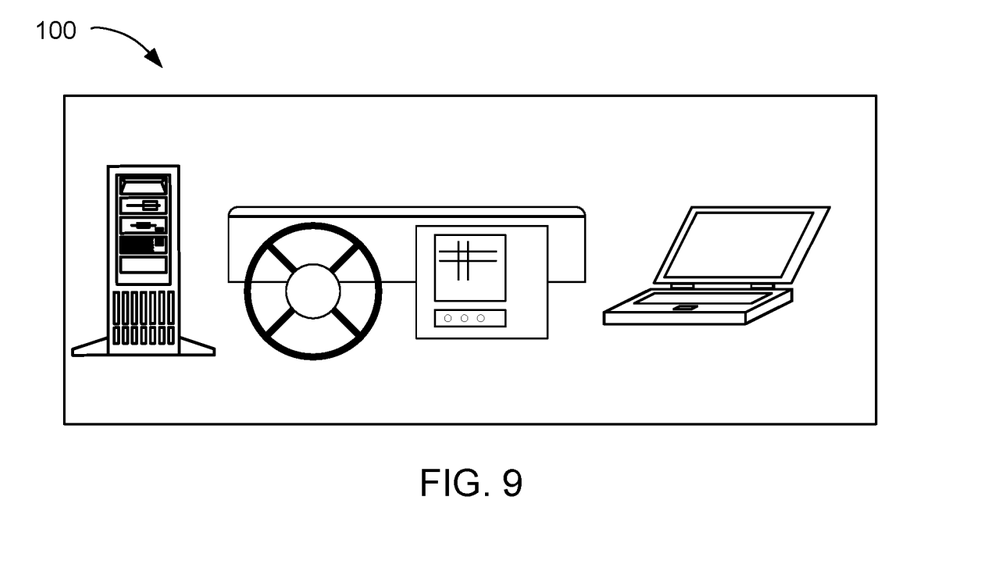
FIG. 9 shows examples of the computing system as application examples with the embodiment of the present invention.

Referring now to FIG. 9, therein are shown examples of the computing system 100 as application examples with the embodiment of the present invention. FIG. 9 depicts various embodiments, as examples, for the computing system 100, such as a computer server, a dash board of an automobile, and a notebook computer.

These application examples illustrate the importance of the various embodiments of the present invention to provide improved assurance of data retention despite interrupted power. The adaptive back-up mechanism for ensuring data is backed up from the volatile memory 106 of FIG. 1 to nonvolatile memory 104 of FIG. 1 without data loss. This is accomplished with the dynamic calculations for the adaptive back-up time 678 of FIG. 5 and the write entries commit 792 of FIG. 7 to back-up a portion of the volatile memory 106 during normal operation. Also, programing various parts of the computing system 100 to optimize the back-up when the power failure 114 of FIG. 1 aides ensuring all the desired data in the volatile memory 106 is backed-up to the nonvolatile memory with just the reserve power source 118 of FIG. 7.

The computing system 100, such as the computer server, the dash board, and the notebook computer, can include a one or more of a subsystem (not shown), such as a printed circuit board having various embodiments of the present invention or an electronic assembly having various embodiments of the present invention. The computing system 100 can also be implemented as an adapter card.

Figure 10:
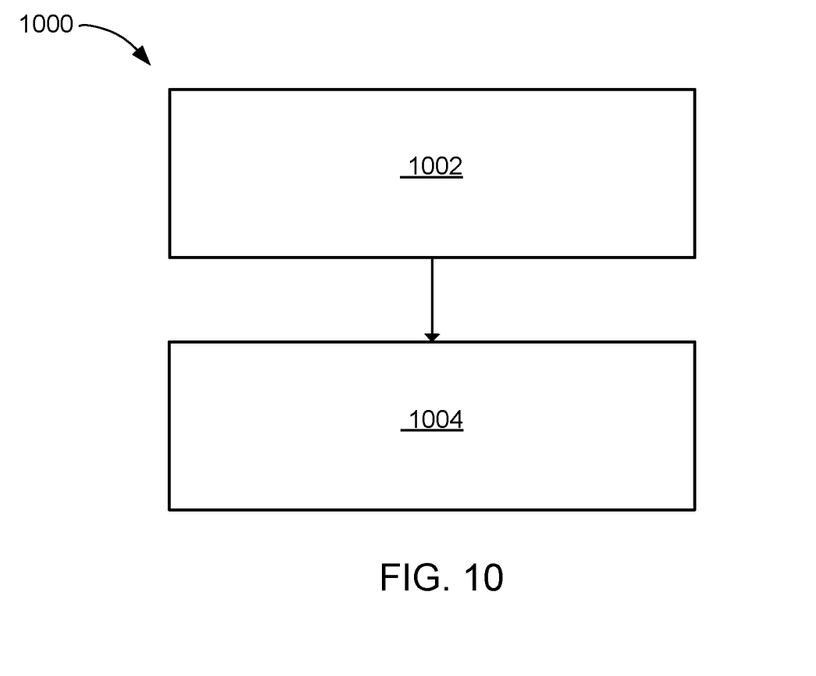
FIG. 10 is a flow chart of a method of operation of a computing system in an embodiment of the present invention.

Referring now to FIG. 10, therein is a flow chart of a method of operation of a computing system 100 in an embodiment of the present invention. The method 1000 includes: calculating an adaptive back-up time based on a reserve power source for backing up a volatile memory to a nonvolatile memory in a block 1002; and backing up at least a portion of the volatile memory to the nonvolatile memory within the adaptive back-up time based on a back-up priority in a block 1004.

The computing system 100 and the other embodiments have been described with module functions or order as an example. The computing system 100 can partition the modules differently or order the modules differently. For example, the program power failure setting module 808 of FIG. 8 can operate before the detect power failure module 806 of FIG. 8. Also for example, the calculate buffer size module 712 of FIG. 7 can occur before the detect change module 710 of FIG. 7.

The modules described in this application can be hardware implementation or hardware accelerators in the computing system 100 and in the other embodiments. The modules can also be hardware implementation or hardware accelerators within the computing system 100 or external to the computing system 100.

The modules described in this application can be implemented as instructions stored on a non-transitory computer readable medium to be executed by the computing system 100 or the other embodiments. The non-transitory computer medium can include memory internal to or external to the computing system 100. The non-transitory computer readable medium can include non-volatile memory, such as a hard disk drive, non-volatile random access memory (NVRAM), solid-state storage device (SSD), compact disk (CD), digital video disk (DVD), or universal serial bus (USB) flash memory devices. The non-transitory computer readable medium can be integrated as a part of the computing system 100 or installed as a removable portion of the computing system 100.

The resulting method, process, apparatus, device, product, and/or system is straightforward, cost-effective, uncomplicated, highly versatile, accurate, sensitive, and effective, and can be implemented by adapting known components for ready, efficient, and economical manufacturing, application, and utilization. Another important aspect of an embodiment of the present invention is that it valuably supports and services the historical trend of reducing costs, simplifying systems, and increasing performance.

These and other valuable aspects of an embodiment of the present invention consequently further the state of the technology to at least the next level.

While the invention has been described in conjunction with a specific best mode, it is to be understood that many alternatives, modifications, and variations will be apparent to those skilled in the art in light of the aforegoing description. Accordingly, it is intended to embrace all such alternatives, modifications, and variations that fall within the scope of the included claims. All matters set forth herein or shown in the accompanying drawings are to be interpreted in an illustrative and non-limiting sense.

What is claimed is:

1. A computing system comprising:
   an adaptive back-up controller configured to calculate an adaptive back-up time based on a reserve power source for backing up a volatile memory to a nonvolatile memory; and
   a processor core, coupled to the adaptive back-up controller, configured to back up at least a portion of the volatile memory to the nonvolatile memory within the adaptive back-up time based on a back-up priority.

2. The system as claimed in claim 1 wherein the adaptive back-up controller is further configured to adjust the adaptive back-up time based on a change to the reserve power source.

3. The system as claimed in claim 1 wherein the adaptive back-up controller is further configured to calculate an available back-up time for the reserve power source based on stopping storage system maintenance functions.

4. The system as claimed in claim 1 wherein:
   the adaptive back-up controller is further configured to calculate a write entries commit from the volatile memory to back-up volatile data functioning as a cache data based on the back-up priority; and the processor core is further configured to back-up the write entries commit.

5. The system as claimed in claim 1 wherein:
the adaptive back-up controller is further configured to adjust a write entries commit from the volatile memory to back-up volatile data functioning as a cache data based on the back-up priority selecting dirty data from the cache data; and
the processor core is further configured to back-up the write entries commit for the dirty data.

6. The system as claimed in claim 1 wherein the adaptive back-up controller is further configured to calculate a write entries commit, based on a nonvolatile latency and a nonvolatile bandwidth, from the volatile memory to back-up.

7. The system as claimed in claim 1 wherein:
the adaptive back-up controller is further configured to adjust the adaptive back-up time based on a change to the reserve power source; and
the processor core is further configured to adjust a write entries commit, based on the adaptive back-up time, from the volatile memory to back-up.

8. The system as claimed in claim 1 further comprising:
a power detector, coupled to the processor core, configured to detect a power failure; and
a power saving path, coupled to the processor core, configured to back-up the portion of the volatile memory to the nonvolatile memory based on the power failure.

9. The system as claimed in claim 1 further comprising:
a power detector, coupled to the processor core, configured to detect a power failure;
a program mode circuitry, coupled to the processor core, configured to program a faster write mode for writing to the nonvolatile memory; and
wherein:
the processor core is further configured to back-up the portion of the volatile memory to the nonvolatile memory with the faster write mode based on the power failure.

10. The system as claimed in claim 1 further comprising:
a power detector, coupled to the processor core, configured to detect a power failure;
wherein:
the processor core is further configured to modify a data transfer mode for the volatile memory to back-up the portion of the volatile memory to the nonvolatile memory based on the power failure.

11. A method of operation of a computing system comprising:
calculating an adaptive back-up time based on a reserve power source for backing up a volatile memory to a nonvolatile memory and
backing up at least a portion of the volatile memory to the nonvolatile memory within the adaptive back-up time based on a back-up priority.

12. The method as claimed in claim 11 wherein calculating the adaptive back-up time includes adjusting the adaptive back-up time based on a change to the reserve power source.

13. The method as claimed in claim 11 wherein calculating the adaptive back-up time based on the reserve power source includes calculating an available back-up time for the reserve power source based on stopping storage system maintenance functions.

14. The method as claimed in claim 11 further comprising:
calculating a write entries commit from the volatile memory to back-up volatile data functioning as a cache data based on the back-up priority; and
wherein:
backing up at least the portion of the volatile memory includes backing up the write entries commit.

15. The method as claimed in claim 11 further comprising:
adjusting a write entries commit from the volatile memory to back-up volatile data functioning as a cache data based on the back-up priority selecting dirty data from the cache data; and
wherein:
backing up at least a portion of the volatile memory to the nonvolatile memory within the adaptive back-up time includes backing up the write entries commit for the dirty data.

16. The method as claimed in claim 11 wherein backing up at least a portion of the volatile memory to the nonvolatile memory within the adaptive back-up time includes calculating a write entries commit, based on a nonvolatile latency and a nonvolatile bandwidth, from the volatile memory to back-up.

17. The method as claimed in claim 11 wherein:
calculating the adaptive back-up time includes adjusting the adaptive back-up time based on a change to the reserve power source; and
backing up at least a portion of the volatile memory to the nonvolatile memory within the adaptive back-up time includes adjusting a write entries commit, based on the adaptive back-up time, from the volatile memory to back-up.

18. The method as claimed in claim 11 further comprising:
detecting a power failure; and
backing up the portion of the volatile memory to the nonvolatile memory based on the power failure and through a power saving path.

19. The method as claimed in claim 11 further comprising:
detecting a power failure;
programming a faster write mode for writing to the nonvolatile memory; and
backing up the portion of the volatile memory to the nonvolatile memory with the faster write mode based on the power failure.

20. The method as claimed in claim 11 further comprising:
detecting a power failure; and
modifying a data transfer mode for the volatile memory to back-up the portion of the volatile memory to the nonvolatile memory based on the power failure.

* * * * *